US007656105B2

(12) United States Patent
Chen (10) Patent No.: US 7,656,105 B2
(45) Date of Patent: Feb. 2, 2010

(54) WIRELESS SIGNAL TRANSMISSION DEVICE FOR A DC BRUSHLESS CEILING FAN MOTOR

(75) Inventor: Chien Hsun Chen, Taichung (TW)

(73) Assignee: Rhine Electronic Co., Ltd., Taichung (TW)

( * ) Notice: Subject to any disclaimer, the term of this patent is extended or adjusted under 35 U.S.C. 154(b) by 356 days.

(21) Appl. No.: 11/865,751

(22) Filed: Oct. 2, 2007

(65) Prior Publication Data

US 2009/0066197 A1    Mar. 12, 2009

(30) Foreign Application Priority Data

Sep. 10, 2007    (TW) ............................... 96215125 U (51) Int. Cl.
*G05D 1/02*    (2006.01)

(52) U.S. Cl. .................. 318/16; 318/675; 318/676; 318/400.01

(58) Field of Classification Search .................. 318/16, 318/675, 676, 695, 700, 400.01, 490; 416/170 R
See application file for complete search history.

(56) References Cited

U.S. PATENT DOCUMENTS

| 4,818,920 A * | 4/1989 | Jacob ............................ 318/16 |
| 6,120,262 A * | 9/2000 | McDonough et al. .... 417/424.1 |
| 7,425,805 B2 * | 9/2008 | Hsu ............................ 318/16 |
| 2008/0037962 A1 * | 2/2008 | Peng et al. ................... 388/838 |
| 2009/0004010 A1 * | 1/2009 | Liao ........................ 416/170 R |
| 2009/0047005 A1 * | 2/2009 | Liao ........................... 388/811 |

* cited by examiner

*Primary Examiner*—Bentsu Ro
*Assistant Examiner*—Thai Dinh
(74) *Attorney, Agent, or Firm*—Ming Chow; Sinorica, LLC (57) ABSTRACT

A wireless signal transmission device for a DC brushless ceiling fan motor that includes a wireless signal transmission device to receive and transmit a signal to a controlling unit, and the controlling unit transmits the control signal to the motor via an electric wire. A wireless signal-transmitting device is installed above the motor. The signal-transmitting device detects the position of the motor and transmits a wireless signal to a signal receiving device, which then transmits the signal to the controlling unit, which further transmits the controlling signal to the motor via of the electric wire, for the purpose of controlling the rotation of the motor. Due to the fact that the signal is transmitted wirelessly, it is not necessary to use any destructive process such as drilling a hole on the body of the ceiling fan, and thus the rigidity and the strength of the components are preserved.

13 Claims, 8 Drawing Sheets

WIRELESS SIGNAL TRANSMISSION DEVICE FOR A DC BRUSHLESS CEILING FAN MOTOR

BACKGROUND OF THE INVENTION

1. Field of the Invention

The present invention relates to a DC brushless ceiling fan motor. More particularly, the present invention relates to a wireless signal transmission device for detecting the position of the motor and controlling the speed of the motor.

2. Description of Related Art

Figure 8:
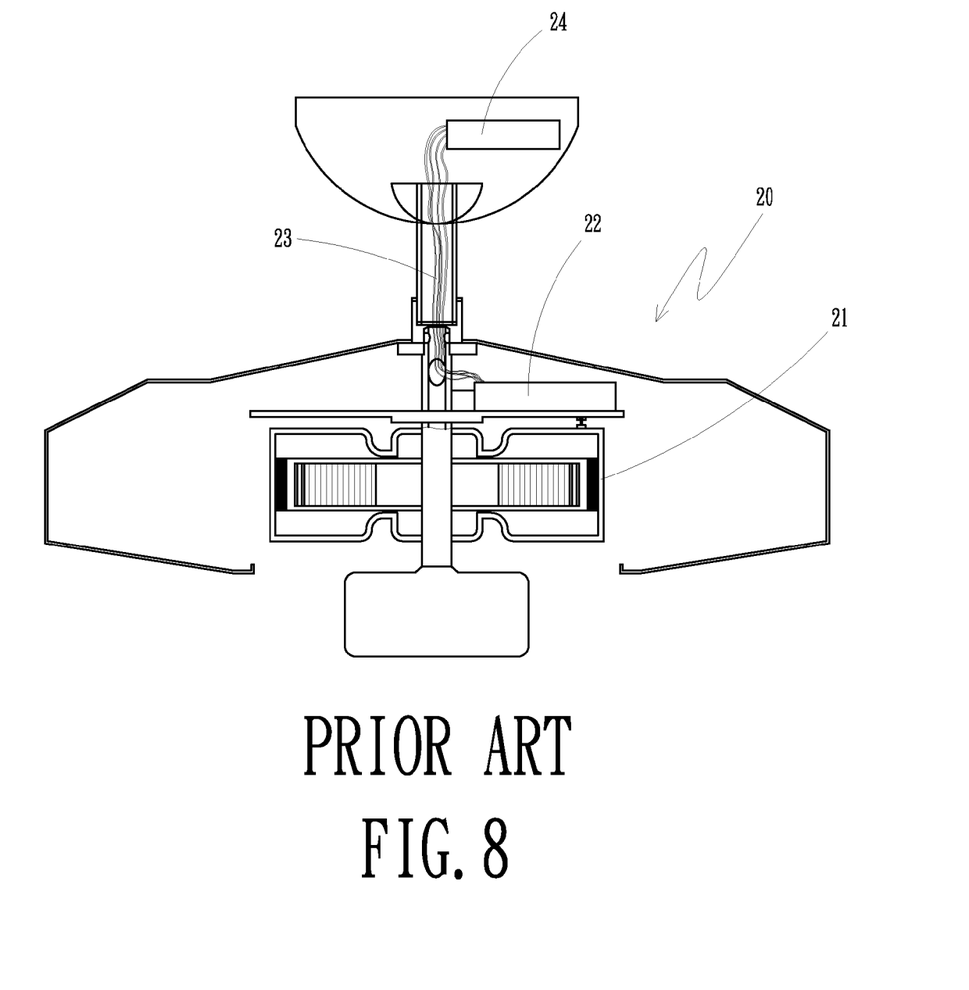
FIG. 8 is a cross-sectional view of a conventional ceiling fan.

A conventional DC brushless ceiling fan motor, as shown in FIG. 8, requires a sensor, such as the Hall sensor, to be installed within the motor to detect the variation of the magnetic field caused by the rotation of the magnet and to send a controlling signal to the motor for continuous and steady operation. The installation of a sensor ensures smooth operation as well as a successful start from a static state. The sensor 22 is installed above the motor 21 of the ceiling fan 20, a signal-transmitting wire 23 is connected with a controlling device 24 of the sensor 22. The position of the motor 21 can be detected by virtue of the sensor 22, which is placed outside of the motor 21, and the sensor can then send a signal to the controlling device 24, via the signal-transmitting wire 23, to control the speed of the ceiling fan 20 motor 21.

However, this configuration contains some improvable defects, such as:

1. Destructive process is required: In order to place the signal transmission wire between the sensor and the controlling device, it is necessary to drill a hole on the body of the fan, allowing the signal transmission wire can be passed through the hole and connected to the controlling device. This process is destructive to the components of the fan, and may cause inconvenience and difficulty during production.

2. Damage to the strength and rigidity of the components: The hole required to allow the signal transmission wire to pass through and connect with the controlling device could compromise the rigidity and strength of the spindle of the motor, affecting the durability of the components.

The present invention is intended to improve upon the above mentioned drawbacks of the conventional DC brushless ceiling fan motor. The present invention provides a wireless signal transmission device for such DC brushless ceiling fan motor.

SUMMARY OF THE INVENTION

The primary object of the present invention provides a DC brushless ceiling fan motor having a wireless signal transmission device therein which comprises a signal-transmitting device and a signal receiving device. The signal-transmitting device is installed atop the motor and the signal receiving device is installed on top of the ceiling fan. An electric wire is connected between the signal receiving device and the motor. The signal-transmitting device detects the position of the motor and transmits a wireless signal to the signal receiving device, which in turn transmits the signal to the motor via the electric wire, controlling the rotation of the motor. It is therefore not necessary to drill a hole in the body of the ceiling fan because the signal is transmitted wirelessly. Therefore, the rigidity and the strength of the components of the fan are not compromised and there is no destructive process.

Another object of the present invention provides a wireless signal transmission device having primary windings as well as secondary windings that are wound around the primary windings. When the motor is in use, the secondary windings interact with a magnetic unit of the signal-transmitting device to create an electric current, and this current supplies power to the signal-transmitting device, and thus the wiring structure of the fan is simplified.

Other objects, advantages and novel features of the invention will become more apparent in the following detailed description taken in conjunction with the accompanying diagrams.

DETAILED DESCRIPTION OF PREFERRED EMBODIMENT

While this invention is capable of embodiment in many different forms, shown in the drawings and herein described in detail is the preferred embodiment of the invention. The preferred embodiment in disclosed with the understanding that the present description is but one example of the principles of the invention and is not intended to limit the broad aspects of the invention to the single embodiment illustrated.

Figure 1:
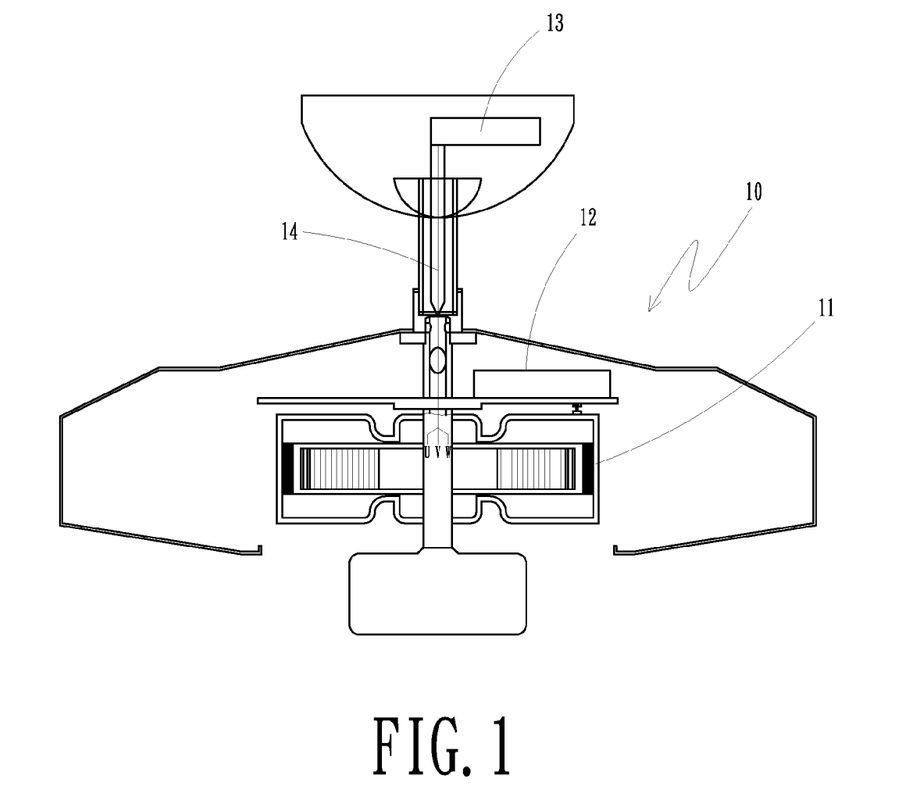
FIG. 1 is a cross-sectional view of the first embodiment of the present invention illustrating the structure of the ceiling fan.
Figure 2:
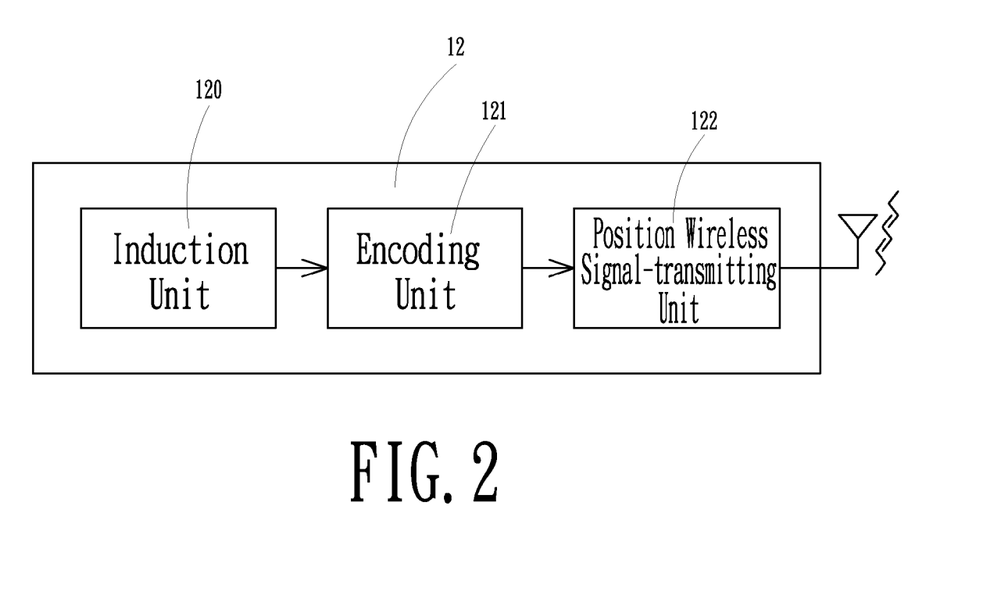
FIG. 2 is a flowchart for the signal-transmitting device of the present invention.
Figure 3:
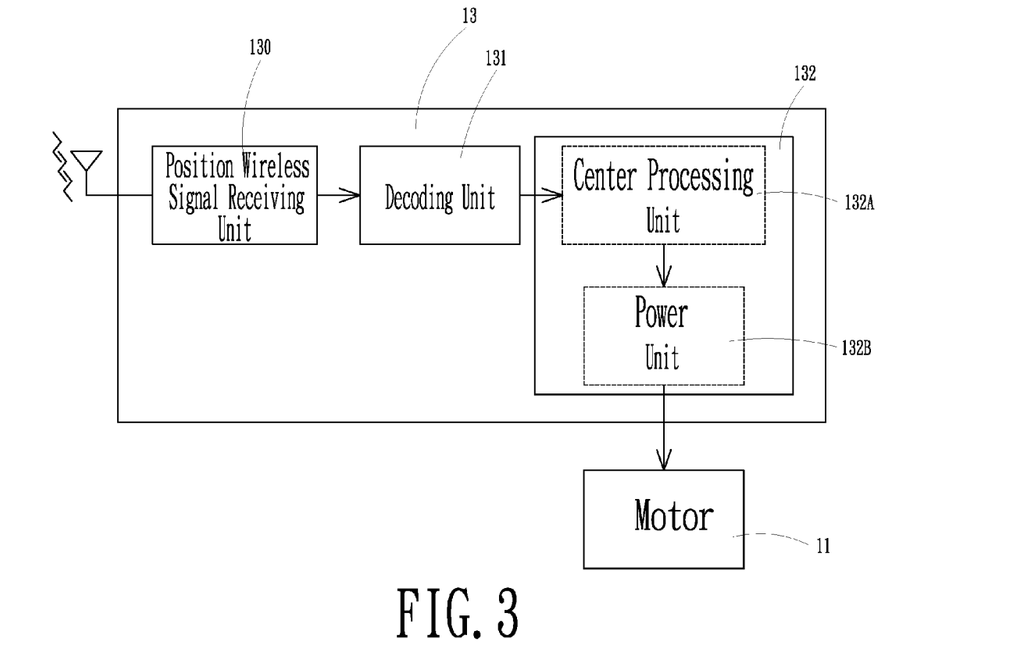
FIG. 3 is a flowchart for the signal receiving device of the present invention.

In reference to FIG. 1 through FIG. 3, the present invention comprises:

A ceiling fan 10 containing a motor 11 therein, a signal-transmitting device 12 located on top of the motor 11 and sharing the same axle with the motor 11, a signal receiving device 13 located above the ceiling fan 10, and an electric wire 14 connected between the signal receiving device 13 and the motor 11. In addition, an induction unit 120, an encoding unit 121 and a position wireless signal-transmitting unit 122 are all installed in the signal-transmitting device 12, and a position wireless signal receiving unit 130, a decoding unit 131 and a controlling unit 132 are all installed in the signal receiving device 13, wherein a central processing unit (CPU) 132A and a power unit 132B are built into the controlling unit 132. The signal-transmitting device 12 is used for transmitting a wireless signal to the signal receiving device 13.

With regard to the structure described above, the signal-transmitting device 12 comprises an induction unit 120, an encoding unit 121 and a position wireless signal-transmitting unit 122; the signal receiving device 13 further comprises a position wireless signal receiving unit 130, a decoding unit 131 and a controlling unit 132, wherein the controlling unit 132 further comprises a central processing unit (CPU) 132A and a power unit 132B. Furthermore, the signal-transmitting device 12 is located above the motor 11, and the signal receiving device 13 is located above the ceiling fan 10. Therefore, the position of the motor 11 can be detected by virtue of the induction unit 120 of the signal-transmitting device 12, which then transmits a signal to the encoding unit 121 for encoding and then to the position wireless signal-transmitting unit 122. A wireless encoded signal is continuously transmitted to the signal receiving device 13 by wireless method. The position wireless signal receiving unit 130 receives the wireless signal, then transmits it to the decoding unit 131 for decoding, which then transmits the decoded signal to the controlling unit 132 to control the central processing unit (CPU) 132A of the controlling unit 132 and to activate the power unit 132B. The electric wire 14 is connected between the signal receiving device 13 and the motor 11, and therefore the power unit 132B will send a controlling signal via the electric wire 14, which further controls the voltage of the motor 11 and the performance of the motor 11.

Figure 4:
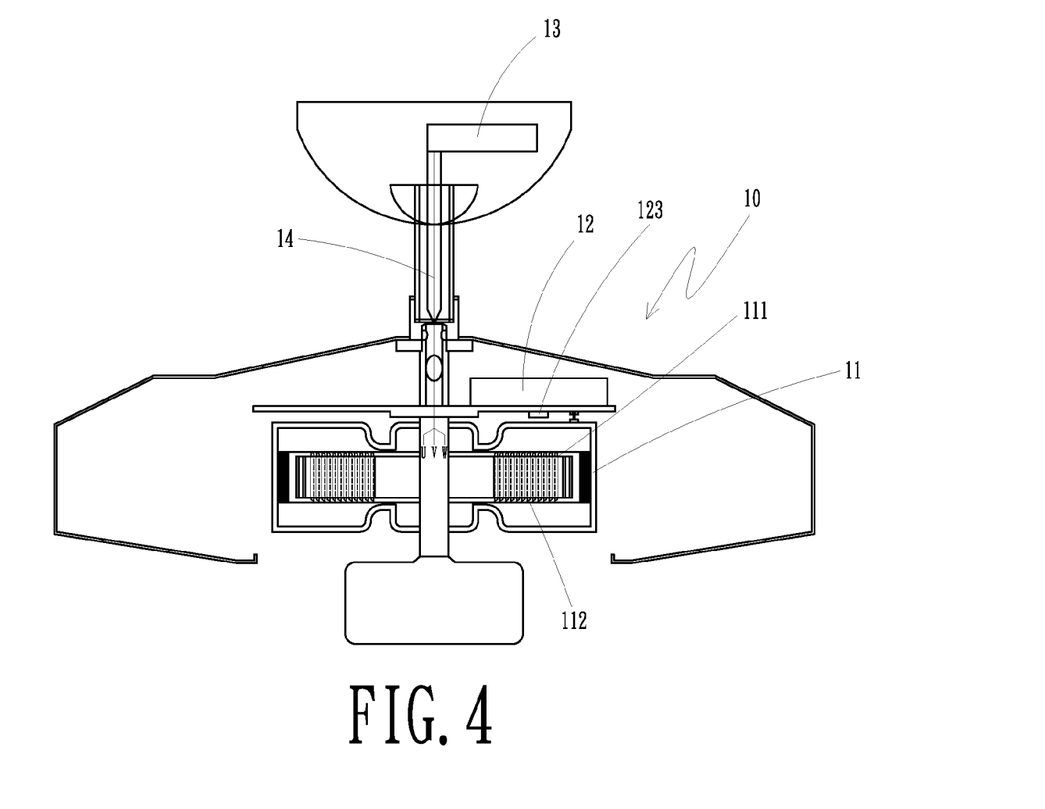
FIG. 4 is a cross-sectional view of the second embodiment of the present invention illustrating the structure of the ceiling fan.
Figure 5:
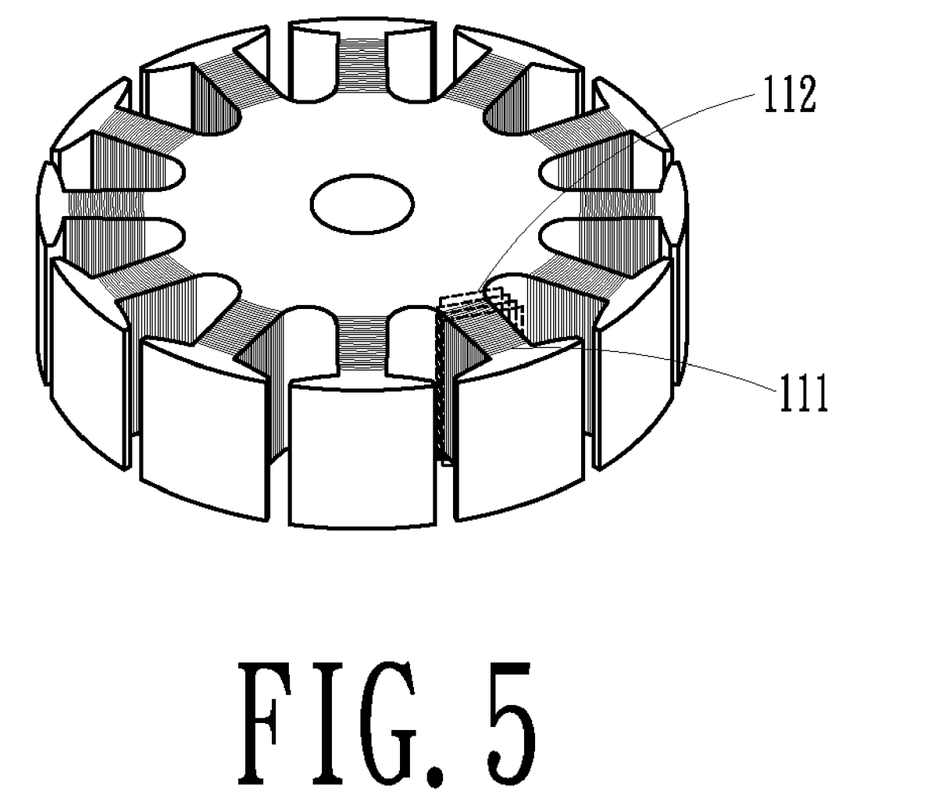
FIG. 5 is a perspective view of an element of the ceiling fan motor.

FIG. 4 and FIG. 5, a cross-sectional view and a perspective view of an element of the ceiling fan motor, respectively, illustrate the second embodiment of the present invention. Similar to the aforesaid first embodiment, the only difference between the embodiments is the second embodiment comprises a signal-transmitting device 12 containing a magnetic unit 123 which is installed underneath the device 12, primary windings 111 in the motor 11 which further comprise secondary windings 112 that wind around the primary windings 111. When the motor 11 is in operation, the secondary windings 112, which wind around the primary windings 111, interact with the magnetic unit 123 of the signal-transmitting device 12, creating an electric current used for supplying power to the signal-transmitting device 12; the signal-transmitting device 12 then transmits the signal to the signal receiving device 13, and then to the motor 11 by virtue of the electric wire 14 that connects to the motor 11.

Figure 6:
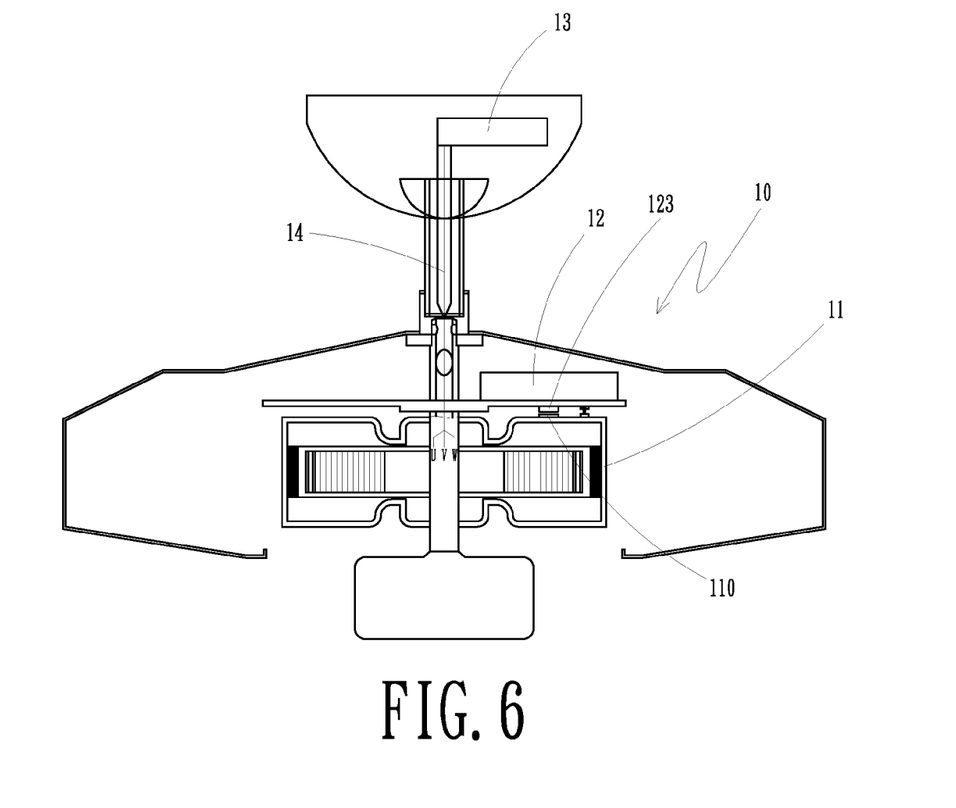
FIG. 6 is a cross-sectional view of the third embodiment of the present invention illustrating the structure of the ceiling fan.

FIG. 6 depicts a cross-sectional view of the ceiling fan motor to illustrate the third embodiment of the present invention. Similar to the aforesaid first embodiment, the only difference between the embodiments is the third embodiment comprises a signal-transmitting device 12 having a magnetic unit 123 installed underneath the device 12. Above the motor 11, a windings unit 110 is installed opposite the magnetic unit 123 of the signal-transmitting device 12. When the motor 11 is in operation, the windings unit 110 interacts with the magnetic unit 123 of the signal-transmitting device 12, creating an electric current, which is used to supply power to the signal-transmitting device 12.

Figure 7:
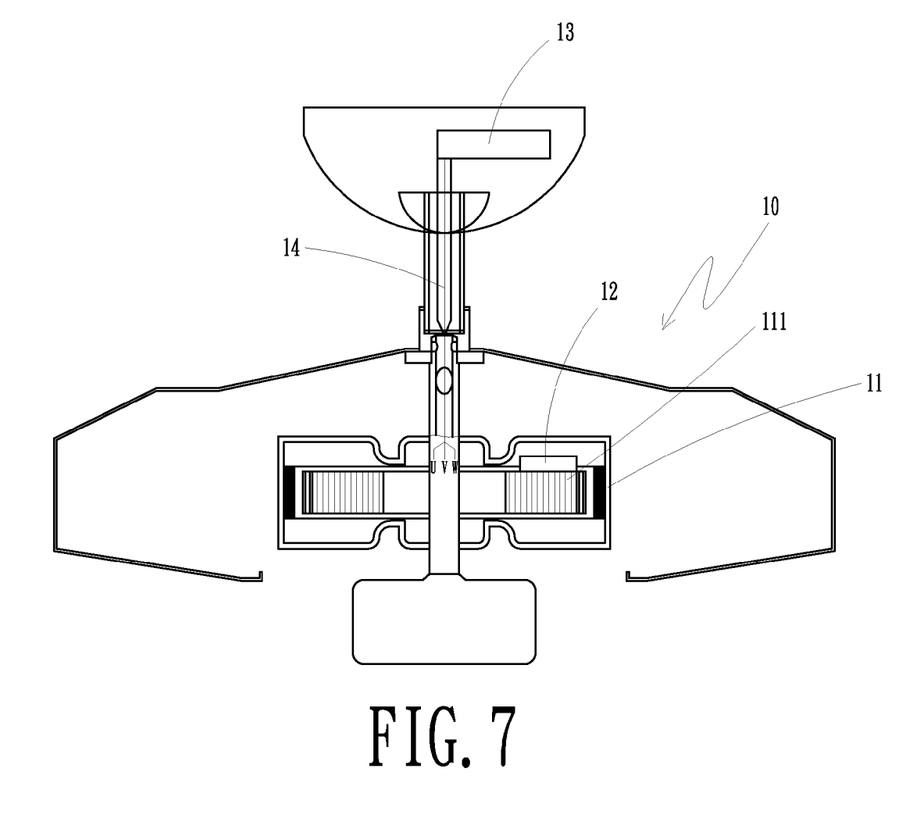
FIG. 7 is a cross-sectional view of the fourth embodiment of the present invention illustrating the structure of the ceiling fan.

FIG. 7 is a cross-sectional view of the ceiling fan motor and illustrates the fourth embodiment of the present invention. Similar to the aforesaid first embodiment, the only difference between the embodiments is the fourth embodiment comprises a signal-transmitting device 12 installed inside the motor 11, allowing it to detect the position of the motor 11 directly and to detect the position of the magnet in the motor 11 at the same time. In addition, the power of the signal-transmitting device 12 is supplied by the primary windings 111, so as to transmit the signal to the signal receiving device 13.

In the light of the above, the advantages of the present invention include:

1. Destructive process is unnecessary: Because signal transmission is achieved wirelessly between the signal-transmitting device and the signal receiving device, it is not necessary to drill a hole in the body of the fan, thus simplifying and reducing difficulty in the manufacturing process.

2. Component rigidity and strength is preserved: Because the signal transmission is achieved wirelessly between the signal-transmitting device and the signal receiving device, it is not necessary to drill a hole in the body of the fan, and the rigidity and strength of the components is not compromised.

3. Wiring structure in the fan is simplified: to the power supply of the wireless signal transmission is created by the interaction of the windings unit and the magnetic unit, which directly supplies power to the signal-transmitting device, and therefore it is unnecessary to add an extra power line to supply power to the device, simplifying the wiring structure of the unit.

Although numerous characteristics and advantages of the present invention have been set forth in the foregoing description, together with details of the structure and function of the invention, this disclosure is one example only, and changes may be made with regard to specific details, particularly in matters of shape, size, and arrangement of parts within the invention to the full extent indicated by the general meaning of the terms in which the appended claims are expressed.

What is claimed is:

1. A DC brushless ceiling fan motor comprising:
a ceiling fan containing a motor, a signal-transmitting device and a signal receiving device; wherein, the signal-transmitting device is installed above the motor, and an electric wire connects the signal receiving device and the motor; the signal receiving device receives a wireless signal from the signal-transmitting device and transmits a control signal to the motor by virtue of the electric wire.

2. A DC brushless ceiling fan motor as claimed in claim 1, wherein the signal-transmitting device shares the same axle with the motor.

3. A DC brushless ceiling fan motor as claimed in claim 1, wherein the signal receiving device is installed above the ceiling fan.

4. A DC brushless ceiling fan motor comprising:
a ceiling fan having a motor, a signal-transmitting device and a signal receiving device; wherein, the signal receiving device connects with the motor by virtue of an electric wire, a magnetic unit is installed underneath the signal-transmitting device, and primary windings of the motor, having secondary windings are wound around the primary windings; when the motor is in operation, the secondary windings which wind around the primary windings, interact with the magnetic unit of the signal-transmitting device and create an electric current used to supply power to the signal-transmitting device; the signal-transmitting device then transmits the signal to the signal receiving device, and then to the motor by virtue of the electric wire that connects to the motor.

5. A DC brushless ceiling fan motor as claimed in claim 4, wherein the signal-transmitting device shares an axle with the motor.

6. A DC brushless ceiling fan motor as claimed in claim 4, wherein the signal receiving device is installed above the ceiling fan.

7. A DC brushless ceiling fan motor as claimed in claim 4, wherein the signal-transmitting device further comprises an induction unit, an encoding unit and a position wireless signal-transmitting unit, which are conducted one another; furthermore, the signal receiving device further comprises a position wireless signal receiving unit, a decoding unit and a controlling unit, which are also conducted one another; the position of the motor is detected by the induction unit of the signal-transmitting device then transmitted to the encoding unit for encoding and further to the position wireless signal-transmitting unit; a wireless encoded signal is wirelessly transmitted to the signal receiving device; the position wireless signal receiving unit receives the signal and transmits it to the decoding unit for decoding, and it is then transmitted finally to the controlling unit; due to the electric wire connected between the signal receiving device and the motor, a controlling signal is sent by the controlling unit via the electric wire and in turn controls the motor.

8. A DC brushless ceiling fan motor as claimed in claim 7, wherein the controlling unit comprises a central processing unit (CPU) and a power unit; when the wireless signal is transmitted to the central processing unit (CPU) and next to the power unit, the voltage of the motor is controlled.

9. A DC brushless ceiling fan motor as claimed in claim 4, wherein the signal-transmitting device contains a magnetic unit installed underneath the signal-transmitting device; above the motor, a windings unit is installed opposite the magnetic unit of the signal-transmitting device; when the motor is in operation, the windings unit interacts with the magnetic unit of the signal-transmitting device to create an electric current, and this current supplies power to the wireless signal transmission device.

10. A DC brushless ceiling fan motor comprising:
a ceiling fan having a motor, a signal-transmitting device and a signal receiving device, wherein the signal-transmitting device is installed on the inside of the motor, the signal-transmitting device conducts with the primary windings, and the signal receiving device conducts with the motor via the electric wire; the power for the signal-transmitting device is supplied by the primary windings, and the signal is transmitted to the signal receiving device, which in turn controls the motor.

11. A DC brushless ceiling fan motor as claimed in claim 10, wherein the signal receiving device is installed above the ceiling fan.

12. A DC brushless ceiling fan motor as claimed in claim 10, wherein the signal-transmitting device further comprises an induction unit, an encoding unit and a position wireless signal-transmitting unit, which are conducted one another; furthermore, the signal receiving device further comprises a position wireless signal receiving unit, a decoding unit and a controlling unit, which are also conducted one another; the position of the motor is detected by the induction unit of the signal-transmitting device, which then transmits a signal to the encoding unit for encoding, after which it is further transmitted to the position wireless signal-transmitting unit; a wireless encoded signal is wirelessly transmitted to the signal receiving device, then a position wireless signal receiving unit receives the signal and transmits it to the decoding unit for decoding, after which the decoded signal is transmitted to the controlling unit; due to the electric wire connected between the signal receiving device and the motor, a controlling signal is sent by the controlling unit via the electric wire, and in turn controls the motor.

13. A DC brushless ceiling fan motor as claimed in claim 10, wherein the controlling unit comprises a central processing unit (CPU) and a power unit; when the wireless signal is transmitted to the central processing unit (CPU) and next to the power unit, the voltage of the motor is controlled.

* * * * *